United States Patent
Unger et al.

(10) Patent No.: US 7,076,666 B2
(45) Date of Patent: Jul. 11, 2006

(54) HARD DISK DRIVE AUTHENTICATION FOR PERSONAL VIDEO RECORDER

(75) Inventors: Robert Allan Unger, El Cajon, CA (US); Christopher Jensen Read, San Diego, CA (US); Robert L. Hardacker, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 214 days.

(21) Appl. No.: 10/277,605

(22) Filed: Oct. 17, 2002

(65) Prior Publication Data

US 2004/0078582 A1 Apr. 22, 2004

(51) Int. Cl.
*H04L 9/00* (2006.01)
*G06F 12/00* (2006.01)

(52) U.S. Cl. ............ 713/189; 713/163; 713/169; 711/163; 360/1; 725/92; 720/600

(58) Field of Classification Search ........... 713/163, 713/169, 189, 202, 194; 711/163; 360/1; 725/92; 720/600; 726/2; 365/1
See application file for complete search history.

(56) References Cited

U.S. PATENT DOCUMENTS

| 5,375,243 | A | * | 12/1994 | Parzych et al. ............ 713/202 |
| 5,677,952 | A | * | 10/1997 | Blakley et al. ............ 713/189 |
| 6,058,476 | A | * | 5/2000 | Matsuzaki et al. ......... 713/169 |
| 6,073,236 | A | * | 6/2000 | Kusakabe et al. ......... 713/169 |
| 6,115,815 | A | * | 9/2000 | Doragh et al. ............ 713/2 |
| 6,442,525 | B1 | * | 8/2002 | Silverbrook et al. ........ 705/1 |
| 6,487,646 | B1 | * | 11/2002 | Adams et al. ............ 711/163 |
| 6,625,729 | B1 | * | 9/2003 | Angelo et al. ............ 713/2 |
| 6,850,252 | B1 | * | 2/2005 | Hoffberg ................ 715/716 |
| 2001/0023375 | A1 | * | 9/2001 | Shen ................... 700/83 |
| 2003/0188162 | A1 | * | 10/2003 | Candelore et al. ......... 713/169 |

OTHER PUBLICATIONS

MeneZes et al., Handbook of Applied Cryptography, 1997, CRC Press LLC, pp. 397-402.*

* cited by examiner

*Primary Examiner*—Taghi T. Arani
(74) *Attorney, Agent, or Firm*—John L. Rogitz

(57) ABSTRACT

A PVR is selectively granted access to a hard disk drive. The HDD generates a random number, encrypts it with a key known to the PVR, and sends it to the PVR, which decrypts the number and increments it by one to render a new number. The new number is encrypted with the key and sent back to the HDD, which decrypts the new number, decrements it by one, and compares the result to the original number, granting the PVR access only when a match occurs.

4 Claims, 2 Drawing Sheets

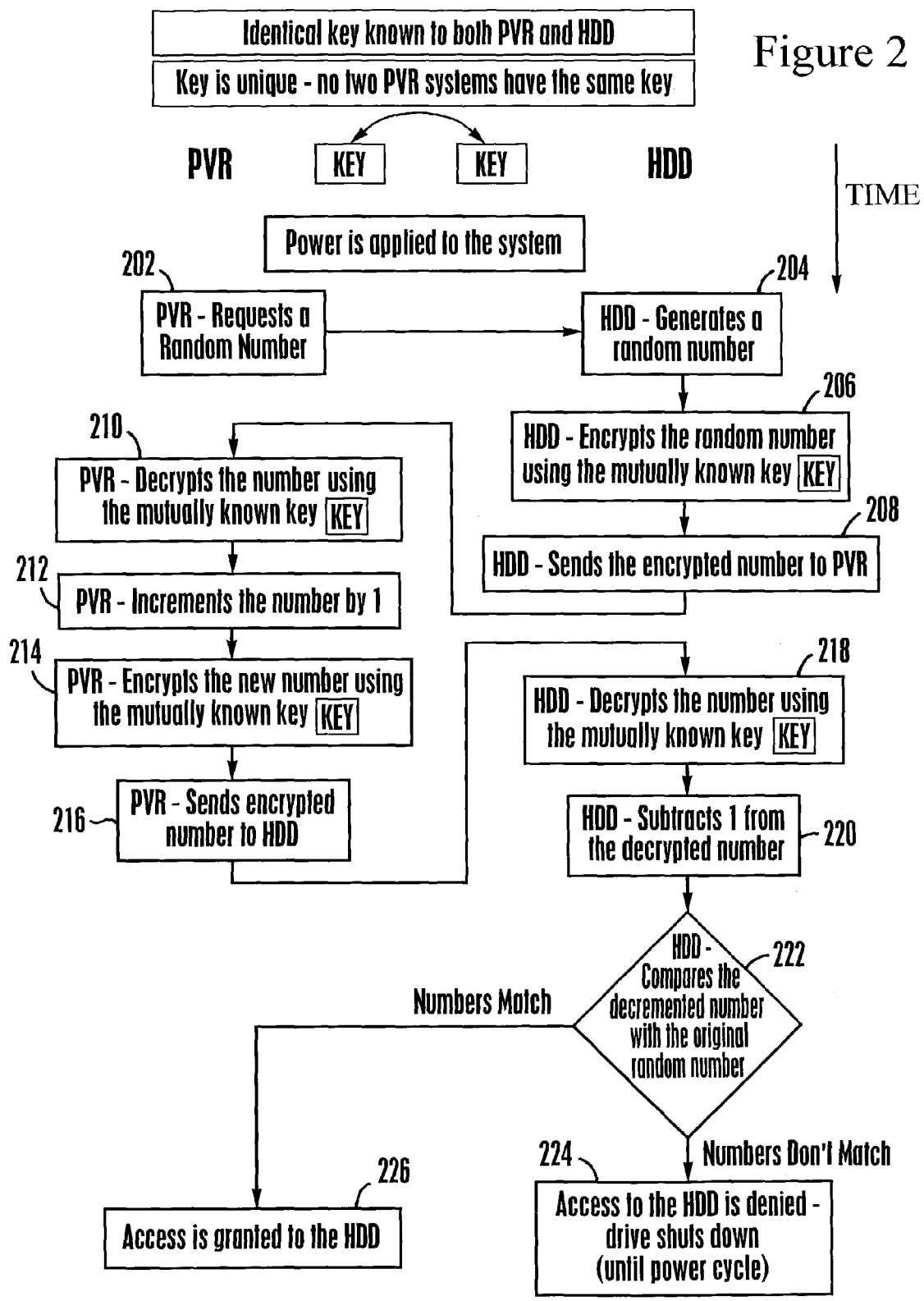

HARD DISK DRIVE AUTHENTICATION FOR PERSONAL VIDEO RECORDER

BACKGROUND OF THE INVENTION

1. Field of the Invention

The present invention is directed to a security detection system for a personal video recorder (PVR) with a hard disk drive (HDD), or other kind of digital multimedia device. More particularly, the present invention relates to a tamper resistant detection system that is included with the PVR and the HDD that uses code detection algorithms for verifying a special code is associated with a particular HDD and PVR.

2. Description of the Related Art

HDDs have been used in a multitude of ways and are mounted in PVRs, personal computers and other devices to store picture data and the like. Moreover, there has been a recent rise in the recording capability of such HDDs enabling greater amounts of picture data to be stored. Further, increasingly more valuable picture data of a predetermined format relating to standard definition compressed content can now be stored. Also, in the future, picture data of a predetermined format relating to high definition compressed content will be able to be stored on HDDs.

Copyright laws govern the distribution of picture data and the like.

Consequently, the stored picture data can be subject to theft by the simple removal of the HDD from the PVR and swapping the HDD with other devices for copying, downloading or distributing in other ways the picture data contained therein. Such unauthorized distribution would violate copyright laws, and therefore must be prevented.

Also, the manufacturing costs of a PVR are high because the largest capacity, most expensive HDD is always desired. In some instances, it has become necessary to subsidize the manufactured PVR to stimulate consumer consumption such that the cost of purchasing the PVR can sometimes be less than the cost of an individual HDD purchased separately.

Consequently, a consumer might be inclined to save costs by instead of purchasing a HDD, by purchasing a PVR and removing the HDD for use with other devices. As a result, such actions could prove to be costly to the manufacturer and eventually lead to the removal of the subsidization of this kind of device. With the removal of subsidies, there would eventually be an increase in costs to the consumer and perhaps even diminished demand for PVRs by the consumer.

SUMMARY OF INVENTION

A method for securing a data storage device includes providing a numerical key to the storage device and an access device intended to access the storage device, and then confirming, by the storage device, that the access device has the key before the storage device responds to any commands at least from the access device to access the stored data. The confirming act may include exchanging an encrypted random number, wherein the numerical key is an encryption key. Preferably, in the presence of an access request, if the storage device determines that the access device does not have the numerical key, the storage device disables itself until power to the storage device has been turned off and restored. In another aspect, a method for securing a hard disk device includes providing an encryption key to a component and to a hard disk device (HDD) associatable with the component, and encrypting an original number, preferably an original random number, using the code to render an encrypted original random number. The method also includes sending the encrypted original random number to a receiving one of the component and the HDD, and decrypting the encrypted original random number to render a decrypted original random number at the receiving one. The decrypted original random number is processed at the receiving one using a predetermined processing protocol to render a new number, which is encrypted with the key to render an encrypted new number and then transmitted to the other device. The encrypted new number is decrypted to render a decrypted new number, and using an inverse of the processing protocol, the new number is processed to render a test number. The HDD grants access to the component only if the test number matches the original number. The component can be a PVR or set top box.

In another aspect, a system includes a generating component and an accessing component communicating with the generating component, with both components possessing the same encryption key. The generating component generates an original random number, encrypts it with the key, and sends it to the accessing component, which decrypts the number and processes it to render a new number that is sent back to the generating component and reversed processed to render a test number. The accessing component is granted access to the generating component only when the test number matches the original random number.

In still another aspect, a method for granting access includes generating a random number at a first device, encrypting it with a key, sending it to a second device having knowledge of the key, decrypting and processing the number at the second device and sending an encrypted version of the processed number to the first device, decrypting the encrypted version and reverse processing it at the first device, and comparing it to the random number to selectively grant, to one of: the first device, or the second device, access to the other of: the first device, or the second device.

BRIEF DESCRIPTION OF THE DRAWINGS

A preferred embodiment of the present invention will be described in detail based on the drawings, wherein:

FIG. 2 is a diagram for explaining authentication usage when using the PVR with the HDD.

DESCRIPTION OF THE PREFERRED EMBODIMENTS

Figure 1:
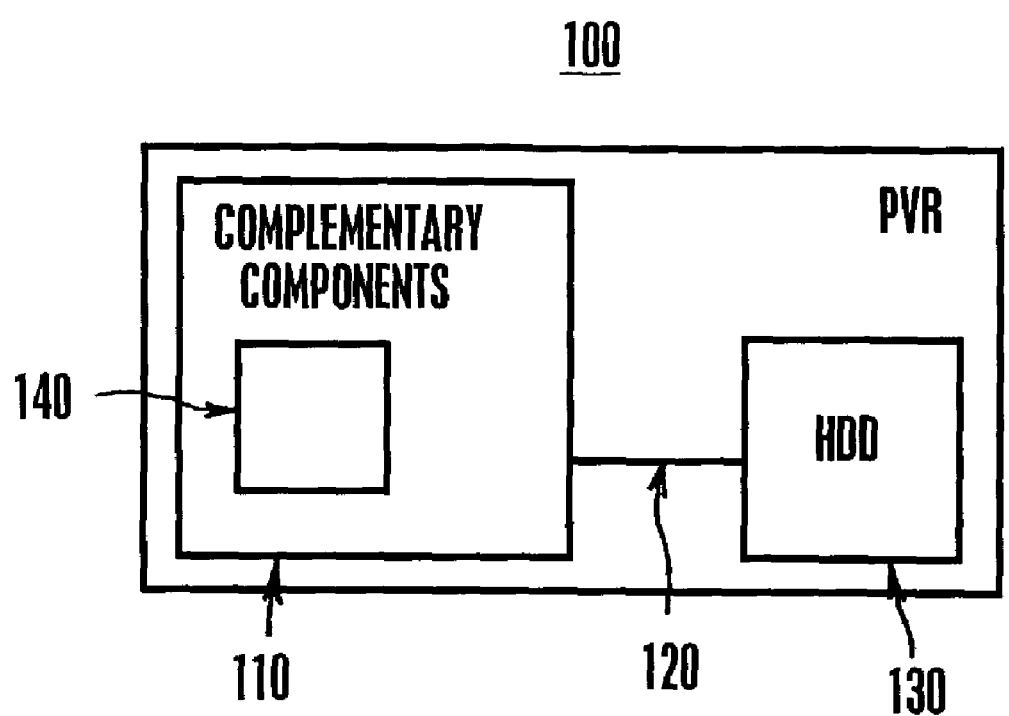
FIG. 1 is a block diagram illustrating a configuration of a PVR coupled to a HDD to which the present invention has been applied.

Hereinafter, an embodiment of the present invention will be described with reference to the accompanying drawings as required.

Referring initially to FIG. 1, a system 100 includes a PVR 110 (an example of "complementary component") that communicates, via a communication path or bus 120, with a HDD 130 according to an embodiment of the present invention.

The HDD 130 is constructed to be mountable in the PVR 110. Also, the HDD can be mounted in personal computers or the like by virtue of its size, shape and interface. If desired, the PVR can be implemented in a set top box.

The HDD 130 is a randomly accessible storage device capable of storing programs, picture data and the like as files of predetermined formats. Further, the HDD has a large storage capacity of several tens of gigabytes to several hundred gigabytes. In use with a PVR, the HDD can receive and record inputs of broadcast picture data and data about broadcast picture data, such as electronic program guide data, from a decoder (not shown) or other communications controller 140. This picture data, which is recorded, can be time shifted and outputted when necessary.

The preferred communications controller 140 controls online communication by telephone lines, cable, wireless communication and the like.

When assembling a PVR 110, a special code, also referred to herein as a "key" can be written from the PVR 110 to the HDD 130. This special code can be stored permanently in the HDD 130. This requires either a surface portion of a disk surface (not shown) of the HDD 130 or a nonvolatile memory such as NVRAM or flash memory to permanently store the special code. Also, the special code is stored through the assembly process on the PVR 110 and separately stored on the HDD 130. Hence, this special code links together the PVR 110 and the HDD 130. No two PVRs in the system 100 have the same special code/key.

This special code can be a 56 to 128 bit or greater code. There are many possible ways from which the special code can be generated. For example, the special code could be generated from the box number of the PVR, serial number of the PVR, real-time clock of the PVR, a random number generator etc.

FIG. 2 is a diagram of a special code authentication process for the tamper resistant detection system according to an embodiment of the present invention. Initially, at 202 a random number is requested by the PVR. The HDD proceeds to create the random number at 204 and encrypt it at 206 using the mutually known key. At 208, the HDD returns the created random number to the PVR, which decrypts the random number using the key at 210.

The HDD/PVR can perform this encryption/decryption operation by using a variety of useful data encryption techniques to encrypt the random number using the special code. Examples of such useful encryption technique are the encryption standard which are promoted by the National Institute of Standards that use a private key algorithm to encrypt data.

At 212 the PVR increments the random number by a predetermined amount, e.g., one, and then encrypts the new number at 214 using the key. The encrypted version of the new number is sent back to the HDD at 216, which decrypts it at 218 and subtracts the predetermined amount, in this example, one, from the decrypted number at 220 to render a test number. More generally, the HDD uses, on the new number, the reverse of the PVR's processing protocol to generate the test number.

Proceeding to phase 222, the HDD performs a comparison operation to compare the decrypted and decremented random number (i.e., the test number) with the original random number. If they don't match, access to the HDD is denied at 224, and if desired the HDD can be shut down until its power is cycled. If the numbers match, however, access is granted to the HDD at 226.

In an alternative embodiment this comparison operation could be performed by the PVR. In this other case, the HDD would pass only the encrypted random number to the PVR and the comparison operation would be performed by the PVR.

The alternate comparison operation is essentially identical to the operation discussed above.

Further, an example of the above described security system in operation to prevent the unauthorized removal of stored picture data is described as follows: A consumer may desire to record picture data using a PVR and store this record picture data on the HDD of the PVR. Next, the consumer may want to view, use or distribute this picture data using other devices. Hence, the consumer would proceed to physically remove the HDD from the PVR to transfer the picture data from the HDD. Next, the consumer would attach the HDD to a personal computer or the like to download the picture data to other devices. The tamper resistant detection method of the present invention, upon activation of the other device would start-up and search for the special code on the other device. Not finding the special code, the HDD would lockout and not operate. Hence, the consumer is prevented from transferring the stored picture data from the HDD.

If the HDD was removed and connected to a different system, the different system would not have the special code so the special code authentication process would lock out the HDD. Therefore, the HDD would be useless in any system other than the original system for which it was assembled.

As a security precaution, and to reduce the possibility of a brute force approach to decipher the special code, the HDD would disable itself after a failed authentication attempt to prevent additional decipher attempts. Future authentication attempts would only be allowed after the power to the system had been turned OFF and then turned ON again.

Greater security is achieved with a unique special code for each PVR; however, such security could prove detrimental during manufacturing operations. Essentially, it might become necessary to scrap an HDD that is assembled with a PVR that failed the authentication test. Therefore, for manufacturing operations, it is better to have an unique special code for a set of PVRs. As an example, a set could constitute one full day of inventory of PVRs for assembly to enable the replacement of multiple HDDs in PVRs during the assembly day. As a result of having a set of PVRs with unique special codes, a defective PVR could be replaced with another PVR while utilizing the same HDD as both PVRs would have the same special code.

An alternative approach, to achieving greater manufacturing productivity by the ability to reuse HDDs from defective PVRs would be to have a re-initialization method. The removed HDDs would be re-initialized with specialized equipment to enable them to accept a new code. Thereby, the re-initialized HDDs could be replaced in additional PVR for use with the new code.

Although the invention is described herein with reference to the preferred embodiment, one skilled in the art will readily appreciate that other applications may be substituted for those set forth herein without departing from the spirit and scope of the present invention.

What is claimed:

1. A method for securing a hard disk device, said method comprising:

providing an encryption key to a component and to a hard disk device (HDD) associatable with the component;

encrypting an original number using the key to render an encrypted original number:

sending the encrypted original number to a receiving one of the component and the NDD;

decrypting the encrypted original number to render a decrypted original number at the receiving one;

processing the decrypted original number at the receiving one using a predetermined processing protocol in render a new number;

encrypting the new number with the key at the receiving one to render an encrypted new number;

transmitting the encrypted new number from the receiving one to the other of the component and the HDD;

decrypting the encrypted new number to render a decrypted new number;

using an inverse of the processing protocol, processing the new number to render a test number; and confirming, by the hard disk device, that the component has the key before the hard disk device responds to any commands at least from the component to access stored data, confirmation that the component has the key being indicated only if the test number matches the original number.

2. The method of claim 1, wherein the component is a PVR.

3. The method of claim 1, wherein said match is performed using standard matching algorithms.

4. The method of claim 1, wherein the key is provided to the component during assembly operations.

* * * * *